June 25, 1940.   C. E. HENRIOD, FILS   2,205,832
VARIABLE SPEED TRANSMISSION
Filed June 2, 1937   3 Sheets-Sheet 1
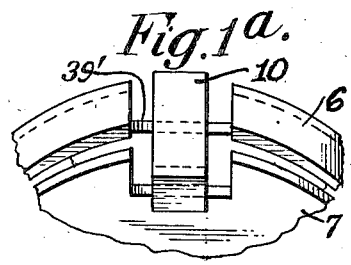
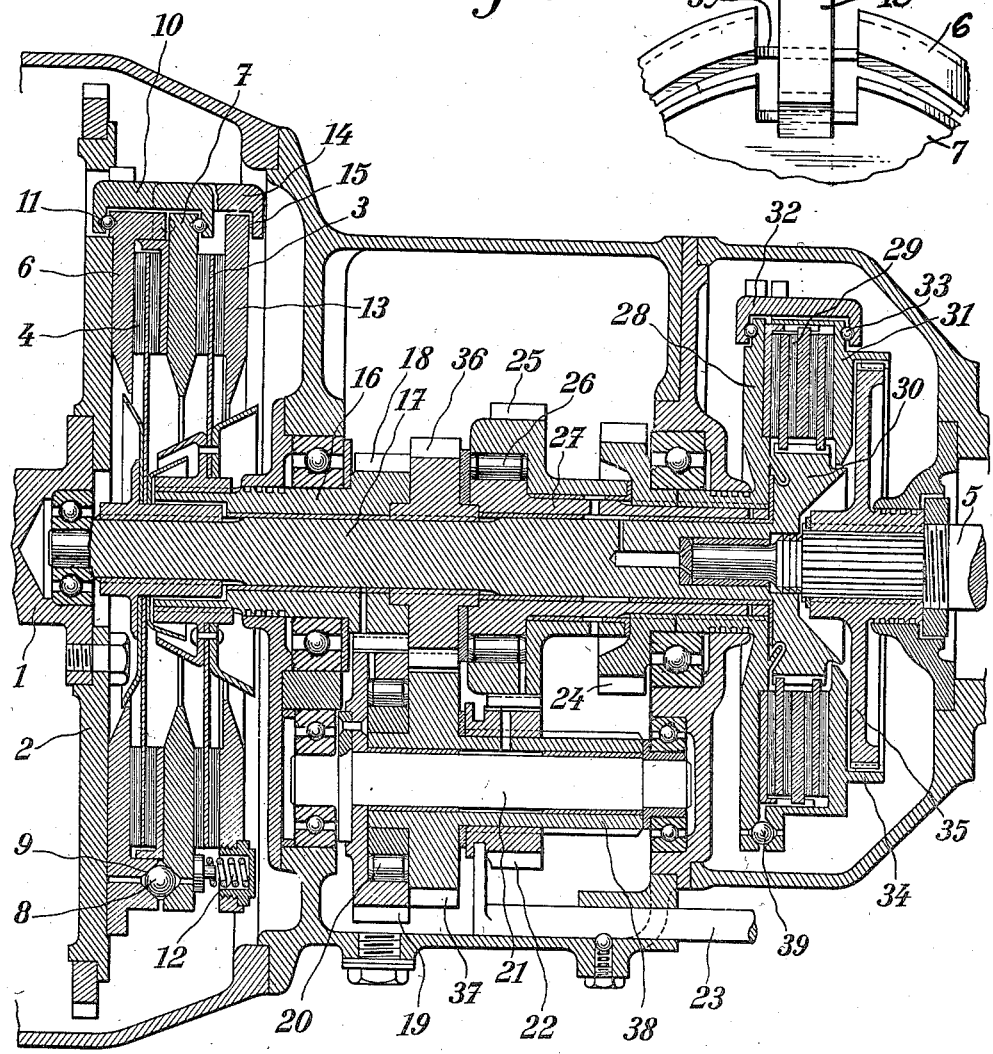
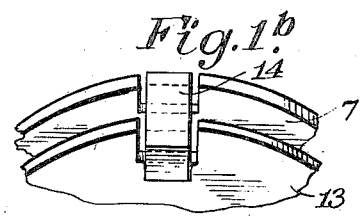
INVENTOR
CHARLES EDOUARD HENRIOD, FILS
BY
ATTORNEYS

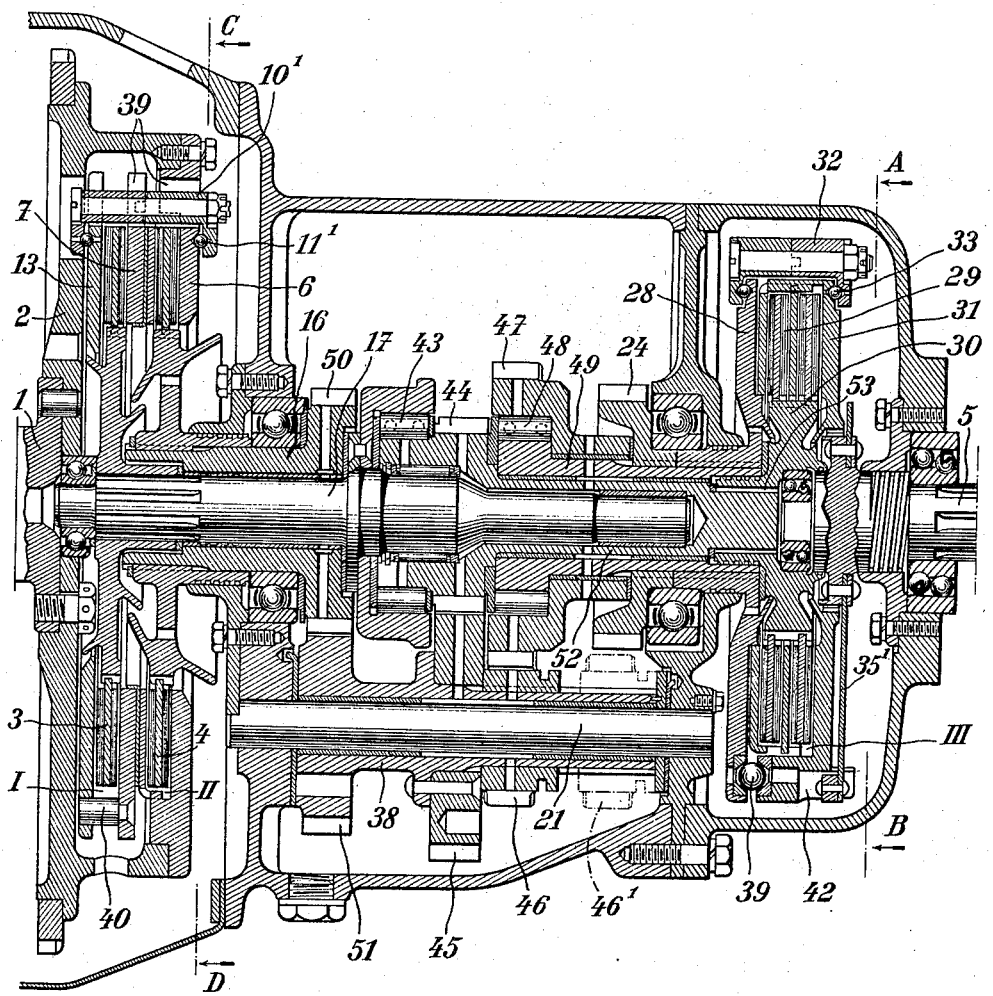

June 25, 1940.  C. E. HENRIOD, FILS  2,205,832
VARIABLE SPEED TRANSMISSION
Filed June 2, 1937   3 Sheets-Sheet 3

Inventor:
Charles Edouard Henriod,
Attorneys

Patented June 25, 1940

2,205,832

UNITED STATES PATENT OFFICE 2,205,832

VARIABLE SPEED TRANSMISSION

Charles Edouard Henriod, Fils, Neuilly-sur-Seine, France

Application June 2, 1937, Serial No. 146,057
In Luxemburg March 17, 1937

8 Claims. (Cl. 74—337)

The present invention relates to variable speed transmissions, and it is especially, although not exclusively, concerned with transmissions of this kind used in connection with automobile vehicles.

The object of the present invention is to provide a device of this kind which is simpler, more efficient, and better capable of meeting the requirements of practice than transmissions as used at the present time.

According to the essential feature of the present invention, I control the bringing into or out of action of the two lower gear combinations through distinct automatic clutches, respectively, and I make use, for the upper gear combinations, of a supplementary automatic clutch, preferably provided at the rear of the gear box, and which is arranged in such manner that, when it is let in, it can transmit to the automatic clutch corresponding to the second gear combination, the reaction produced by the resisting torque, in such manner as to produce the automatic disengagement of this last mentioned clutch and to bring into play a third gear combination, which may correspond either to a reduction gear ratio or to direct drive, as long as the resisting torque remains greater than the driving torque, and to produce the automatic engagement of said last mentioned clutch, as soon as both torques balance each other, which permits of obtaining a fourth gear combination, which may correspond either to direct drive or to a step-up gear ratio.

Other features of the present invention will result from the following detailed description of some specific embodiments thereof.

Preferred embodiments of the present invention will be hereinafter described, with reference to the accompanying drawings, given merely by way of example, and in which:

Fig. 1 is an axial sectional view of a variable speed and automatic control transmission made according to a first embodiment of the present invention;

Figs. 1a and 1b are perspective views showing the mounting of the masses according to the invention.

Fig. 2 is a similar view of an analogous transmission made according to a second embodiment of the invention;

Figure 3:
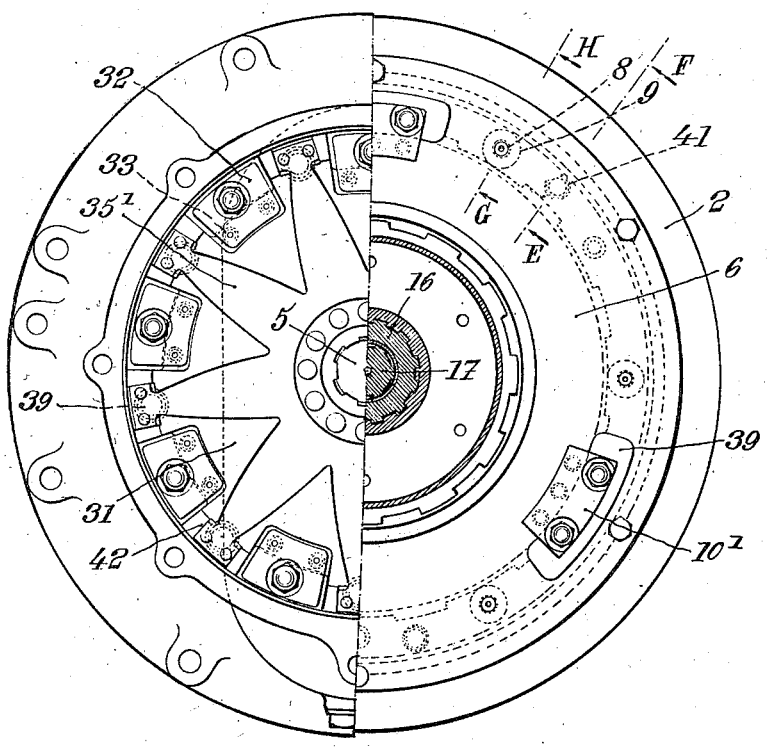
Fig. 3 is a sectional view, partly (left hand side) on the line A—B of Fig. 2, and partly (right hand side) on the line C—D of Fig. 2.
Figure 4:
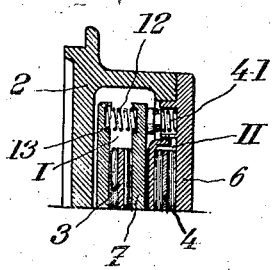
Fig. 4 is a radial sectional part view on the line E—F of Fig. 3.
Figure 5:
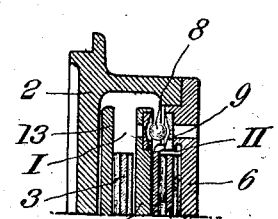
Fig. 5 is a radial sectional part view on the line G—H of Fig. 3.

In the embodiment of Fig. 1, shaft 1, driven by the engine, carries a disc 2 acting as a flywheel, which in turn drives an automatic working coupling device, including two clutches, for instance friction clutches, the friction discs of which are designated, respectively, by reference characters 3 and 4. These clutches correspond respectively to the drive of the driven shaft 5 through the first and second gear combinations.

For the sake of simplicity, I will first describe the structure and operation of clutch 4 corresponding to the second speed. I provide, on either side of the friction disc 4, two annular plates 6 and 7, the plate designated by reference number 6 being rigid with fly-wheel 2 by means of bolts (not shown) and the other being supported by balls or the like 8 housed in circular and tapered recesses 9 provided in the adjacent faces of said annular plates 6 and 7, said balls being distributed at regular intervals from one another and serving chiefly to establish the driving connection between said plates 6 and 7. In the circumferential direction, the walls of these grooves 9 are so inclined that the relative angular displacement of annular plate 7 with respect to plate 6 causes said annular plates to be moved away from each other, and therefore disengages clutch 4. The engagement of the clutch elements is obtained (as described more specifically in connection with Fig. 3) through masses 10 engaged with a suitable play in radial housings 39' (Fig. 1a) provided in the peripheral portions of the annular plates and acting thereon, under the influence of the centrifugal force, through balls or the like 11 cooperating with the inclined walls of circular and tapered recesses provided in said annular plates, said masses 10 acting in opposition to the action of balls 8.

This specific type of clutch does not constitute a feature of the invention and it might be replaced by any other gradual coupling device.

The automatic clutch corresponding to the first speed includes annular plates 7 and 13, located on either side of the friction disc 3. Springs 12 are provided between annular plates 7 and 13 so as to urge them away from each other. Engagement of the clutch elements is automatically produced by centrifugal masses 14 cooperating will balls 15. As these masses extend over the peripheral portions of both of the plates 7 and 13 (Fig. 1b) and are engaged without play in radial housings provided in the peripheries of said annular plates, they cause them to rotate together.

When the device is at rest, the springs 12 hold the clutch 3 out of disengagement. Since a torque is exerted on the driving shaft 1, with a resistance on the driven shaft 5, there is a tendency for an angular displacement between the plates 6 and 7, which causes the balls 8 to shift and thus to displace plate 7 away from plate 6 so that clutch 4 is also disengaged.

It follows from the preceding explanations that annular plates 6, 7 and 13 are connected in rotation by masses 14 and plates 7 and 6 by balls 8, plate 6 being rigid with flywheel 2 and with the driving shaft 1, so that masses 10 and 14 are subjected simultaneously to the action of the centrifugal force. These masses are devised in such manner as to produce first the gradual engagement of clutch 3 (corresponding to the first speed), the latter being fully engaged for a given speed of the engine.

As a consequence of this engagement, the motive power is transmitted through disc 3 to a sleeve 16 keyed to disc 3 and freely rotatable coaxially with an auxiliary shaft 17, itself free to rotate and coaxial with respect to the driven shaft 5. This sleeve 16 carries a gear 18 constantly in mesh with a toothed wheel 19 keyed on an intermediate shaft 21. Wheel 19 drives, through a free-wheel device 20, a sleeve 38, and on this sleeve there is keyed an axially slidable pinion 22 controlled from a distance through a forked rod 23 or any other equivalent means.

This sliding pinion 22 is adapted to occupy any of three characteristic positions, to wit: a median position for bringing the transmission into neutral, a left hand side position (that shown by the drawing) corresponding to all forward speeds, and a right hand side position for reverse gear in which said pinion drives, through a reversing gear, not shown, the gear wheel 24 that corresponds to reverse gear.

When the sliding pinion is in its position corresponding to forward speeds, it is in mesh with a gear wheel 25 mounted, by means of a free-wheel device 26, on a sleeve 27, freely rotatable coaxially on auxiliary shaft 17, whereon is keyed a plate 28 belonging to a clutch device provided at the rear of the gear box and the function of which will be hereinafter explained.

This clutch device is intended to bring into play the third and the fourth gear combinations, the latter corresponding to direct drive. It includes friction elements 29 (either single or double) carried by a central disc 30 integral with the auxiliary shaft 17. On either side of these friction elements 29, there are clutch plates 28 and 31, adapted to cooperate with centrifugal masses 32 and balls 33 and 39 in a manner analogous to that above described with reference to the first clutch, balls 39 serving chiefly to establish the driving connection between plates 28 and 31. The weight of masses 32 is suitably chosen for obtaining the working engagement of this clutch 29 upwardly from a given speed of the vehicle or shaft 5, for which it is possible or necessary to bring into play the third speed. It results from the preceding explanations that plate 28 is positively driven by the gear train corresponding to first gear. The same applies to plate 31, since these two plates are angularly interconnected through balls 39 and masses 32. Plate 31 drives, through a cylindrical clutch element with internal teeth 34, a central toothed disc or plate 35 keyed on the driven shaft 5.

These driving means might be replaced by a flexible driving disc.

Sliding pinion 22 having been brought by forked rod 23 into its forward speed position, in which it is in mesh with gear wheel 25, if the engine is caused to speed up, clutch 3 is gradually applied through the effect of centrifugal masses 14 and against the action of springs 12. When the speed of the engine has become sufficiently high, the driven shaft 5 is caused to work in first gear through clutch 3, sleeve 16, gears 18 and 19, free-wheel device 20, sleeve 38, gear wheels 22 and 25, sleeve 27, plate 28, balls 39, plate 31 and coupling means 34—35. When this combination is working, clutches 4 and 29 are disengaged because the centrifugal force acting on masses 10 and 32 is not sufficient for producing their radial displacement to an amplitude sufficient for engaging the annular friction discs with the intermediate friction elements.

If the engine is further accelerated, I obtain the engagement of the cooperating parts of clutch 4 and movement is then transmitted through this clutch to the auxiliary shaft 17 which carries a pinion 36 constantly in mesh with a toothed wheel 37 rigid with sleeve 38. It follows that the sliding pinion 22 is driven with a gear ratio corresponding to second speed. During this drive, clutch 3 remains in engagement and the gear wheels 16 and 19 of the first gear combination remain in mesh without this involving any drawback, owing to the presence of free-wheel device 20. On the contrary, the rear clutch 29 remains in inoperative position because the speed of shaft 5 transmitted to centrifugal masses 32 through the parts brought into play by the second speed combination is not yet sufficient for bringing said clutch into action.

When the engine is still further accelerated, the speed is obtained for which the third gear combination becomes possible or necessary and for which the automatic engagement of the rear clutch 29 is obtained. It follows that the central disc 30 and the auxiliary shaft 17 are angularly coupled with the plates 28 and 31 of this clutch.

The reaction of the torque transmitted by this clutch 29 is therefore exerted on the disc 4 of the second clutch and this reaction is imparted to annular elements 6 and 7 which cooperate with this disc 4, said reaction being opposed to the action of the driving shaft. As annular disc 6 is rigid with fly-wheel and is continuously driven by it, only annular disc 7 can undergo the effect of this reaction, which results in an angular displacement of annular disc 7 with respect to annular disc 6 (this movement being made possible by the lateral play provided in the housings of the centrifugal masses 10 and in the circular and tapered recesses of balls 11). It follows that balls 8, which cooperate with the sloping walls of recesses 9, move annular discs 6 and 7 away from each other, against the action of centrifugal masses 10, and cause clutch 4 to be disengaged, whereby the element 4 of this clutch and auxiliary shaft 17 cease to be driven by the driving shaft 1. On the contrary, clutches 3 and 29 remain in operative position.

I thus obtain the third gear, through clutch 3, sleeve 16, gear wheels 18 and 19, free wheel device 20, gear wheels 37 and 36, auxiliary shaft 17, central disc 30, clutch 29 and driven shaft 5. The toothed wheels 22—25 (which were brought into play for the first and second speeds) remain in mesh although they turn at a different relative speed, which is made possible by the provision of free-wheel device 26.

When the reaction resulting from the effect of the resisting torque transmitted by clutch 29 and shaft 17 on clutch 4 disappears as a consequence of the balancing of the driving torque and the resisting torque, the effect of the centrifugal masses 10 predominates on that of balls 8 and the latter are pushed back towards the bottom of their recesses 9 in such manner that automatic clutch 4 is again in engagement. In this case the movement is transmitted in direct drive because the clutches 3, 4 and 29 are all in engagement and the relative movements between certain rotary elements of the gear box are rendered possible by the presence of free-wheel devices 20 and 26.

It is obvious that the switching to lower gear combinations is obtained automatically through the same control means and under the influence of the same functional factors of the power plant, to wit the speed of the driving belt shaft 1 and the value of the driving torque, and of the functional factors of the vehicle (or other system driven by the engine) such for instance as the speed of the vehicle and the value of the resisting torque.

In order to obtain reverse gear, it suffices to bring the sliding pinion 22 into mesh with the reversing gear (not visible in the drawing) so that the latter can drive toothed wheel 24, keyed on sleeve 27 under the same conditions as above explained for the drive in first gear.

In the embodiment illustrated by Figs. 2 to 5, the positions of clutches I and II, corresponding respectively to the first and the second gear combinations, are inversed. In other words, the clutch I, corresponding to the first speed, is located close to the fly-wheel 2 driven by the engine, and its friction disc 3 is keyed on the central auxiliary shaft 17. On the contrary, the friction disc 4 of the clutch II corresponding to the second speed is mounted on sleeve 16, freely engaged on the central shaft 17.

Furthermore, instead of making use of distinct centrifugal masses (such as 14 and 10 in the embodiment just above described) for controlling these two clutches respectively, I make use of common centrifugal masses 10¹, which work in the following manner:

Masses 10¹ (for instance there are three of them, as visible on the right hand side of Fig. 3) are engaged with a certain play in housings 39' provided in annular plates 13, 7 and 6 between which the friction discs 3 and 4 are provided, and they extend axially over the whole of these three annular plates. Annular plate 6, which belongs to clutch II, is fixed to fly-wheel 2. As in the preceding embodiment, annular plate 6 drives annular plate 7 through balls of the like 8 housed in tapered recesses 9 (Fig. 5) forming inclined paths in the circumferential direction. The driving connection between the plates 7 and 13 of the clutch I corresponding to the first gear combination is obtained through fingers 40, carried for instance by plate 7 and engaging in corresponding holes of annular disc 13. Plates 7 and 13 are urged away from each other by springs 12. In a similar manner, compressed springs 41 are advantageously provided between the annular discs 6 and 7 of clutch II.

Masses 10¹, which extend axially over the three annular plates 13, 7 and 6, bear upon the external sides of plates 13 and 6 through balls 11¹ housed in circular and tapered recesses, the contour of which is well shown on Fig. 3. The size of the balls 11¹ and the shape of the recesses are such that when the balls are at the deepest ends thereof, springs 12 and 41 move plates 13—7 and 7—6 away from one another respectively and from the corresponding friction discs 3 and 4. In this position, clutches I and II are disengaged. When the speed of the engine increases from the idling speed, the centrifugal force tends to move outwardly masses 10¹, which turn together with fly-wheel 2, and I obtain first the compression of springs 12 and the gradual engagement of clutch I, which causes shaft 5 to be driven in first speed through the gears hereinafter described. As disc 3 is connected to shaft 17 on which the resisting torque acts, and as the plate 7 of clutch I also belongs to clutch II by being connected to plate 6 through balls 8, the latter, under the effect of the resisting torque, move from the deepest ends of their recesses (which corresponds to a slight angular displacement of plates 7 and 6). It follows that plates 6 and 7 are positively moved away from friction disc 4, so that clutch II remains disengaged until, as a consequence of the increase of the engine speed, the centrifugal force has become sufficient for bringing back balls 8 to the bottom of their recesses (while compressing springs 41). At this time, both of the clutches I and II are in operation, and the drive is effected in second speed through means as will be hereinafter described.

Clutch III, preferably located at the rear of the gear box, and which is reserved for the two upper speeds, is arranged in a manner analogous to that above described with reference to Fig. 1. It includes centrifugal masses 32 acting through balls 33 on the plates 28 and 31 which cooperate with the intermediate friction discs 29. Furthermore, this clutch includes balls 39 arranged between plates 28 and 31, and which moves these plates away from each other, so as to produce the disengagement of the clutch, whereas masses 32 are intended to bring this clutch into action.

On the contrary, the connection between plate 31 and the driven shaft 5 is obtained not through a fixed gear 35 and a sliding gear 34 as in the preceding example, but through a disc or plate with flexible blades 35¹, which is riveted on shaft 5 and the ends of which blades are engaged in notches 42 provided in the periphery of plate 31. The function of this clutch III is however different from that above indicated for the analogous clutch of the embodiment of Fig. 1.

When the engine is running at idling speed, the three clutches I, II, III are disengaged under the effect of their respective springs, among which only springs 12 and 41 are visible on the drawing. The centrifugal masses 10¹ and 32 are still inoperative and the balls 8 and 39 are at the bottoms of their respective recesses.

When the speed of the engine is increased, the centrifugal masses 10¹, as above explained, gradually cause the plates 13 and 7 of clutch I to move toward each other, and the driving power is transmitted to the driven shaft through fly-wheel 2, plate 6, balls 8, plates 7 and 13, friction disc 3, central shaft 17, a free-wheel device 43 riveted on said shaft, and pinion 44, freely mounted on shaft 17. This pinion 44 meshes with a toothed wheel 45 rivetted on a sleeve 38 freely mounted on an intermediate shaft 21. This sleeve 21 also carries a toothed wheel 46 in mesh with a gear 47 provided with a free-wheel device 48 through which the movement is transmitted to a sleeve 49 carrying the plate 28 of clutch III. The transmission of movement then takes place through balls 39, plate 31, plate 35¹ with its flexible blades, and finally shaft 5, which is thus driven in first speed. It should be noted that, while this operation is taking place, the two free-wheel devices 43 and 48 act positively in the drive and the action of the resisting torque on plates 6 and 7, which serve to the transmission of the driving force, produces an angular displacement of these plates with respect to each other, in such manner that balls 8 leave the bottoms of their recesses and prevent engagement of the parts of clutch II. The same occurs for plates 28 and 31 of clutch III, for which the centrifugal masses 32 have not a sufficient action for bringing back balls 39 into their respective recesses.

When the speed of the engine is then increased, centrifugal masses 10¹ come, as above explained, into positions for which they bring back the balls into the respective bottoms of their recesses, and this produces the automatic engagement of the cooperating parts of clutch II, while clutch I remains in operation. On the contrary, clutch III is still in inoperative position.

The transmission of the driving force is then effected through clutch II, by means of its friction disc 4, to sleeve 16, which drives the couple of gear wheels 50 and 51, the last mentioned gear 51 being keyed on sleeve 38, which is freely engaged on the intermediate shaft 21. The movement is then transmitted through parts 46, 47, 48, 49, 28, 39 and 35¹, to the driven shaft 5, which is driven in second speed. It should be noted that during this operation, only free wheel 48 acts in a positive manner in the drive. The presence of free wheel device 43 is necessary for permitting toothed wheels 44 and 45 (corresponding to first speed) to remain in mesh and clutch I to remain in engaged position.

When the speed of the engine further increases, either because its working is accelerated or because the resisting torque decreases, there comes a time when the centrifugal masses 32 of clutch III become capable of forcing back balls 39 into their respective recesses, which produces the automatic engagement of the parts of clutch III. The characteristics of clutch II (importance of masses 10¹, size and shape of balls 8 and of the corresponding recesses or grooves) have however been calculated in such manner that the reaction of the resisting torque, which is now transmitted through clutch III which has just been brought into play, becomes sufficient for producing the automatic disengagement of clutch II, whereas clutch I remains in operative position. Under these conditions, the transmission of the driving power takes place through flywheel 2, plate 6, balls 8, plate 7, clutch I, central shaft 17, free-wheel device 43 and gear 44, to the sleeve 52 which carries this gear 44 and also the friction disc 30 of clutch III. As this clutch is in engaged position, the effort is transmitted through plates 28 and 31 to the flexible blade plate 35¹ and the driven shaft. It should be noted that, during this operation, clutches I and III are engaged and clutch II is disengaged, that free-wheel device 43 works positively in the drive and free wheel device 48 permits the free rotation of the couple of gears 47 and 46 with which it cooperates. As the transmission of the driving force takes place without any speed reduction, the driving shaft 1 drives the driven shaft 5 in direct drive (third gear combination).

Finally, when, under these conditions, the driving torque becomes higher than the resisting torque, the engine still accelerates and the centrifugal masses 10¹ become capable of bringing back clutch II into operative position. The transmission of the driving effort is then effected through clutch II, its friction disc 4, sleeve 16, the couple of gear wheels 50 and 51, sleeve 38, the couple of gear wheels 45 and 44, sleeve 52, friction disc 30, keyed at 53 on this sleeve, clutch III and the flexible blade plate 35¹, to the driven shaft. The driving force is therefore transmitted at an increased speed, through gears 50—51 and 45—44, to the driven shaft 5 while clutches I, II and III are operative and free-wheel devices 43 and 48 turn freely, that is to say exert no positive action in the transmission.

It is clear that, when the resisting torque increases or when the driving torque diminishes for any reason, I successively obtain the disengagement of clutch II, which corresponds to passing down to the third gear combination, or direct drive. If these working conditions are still more accentuated, I automatically obtain the disengagement of clutch III and the engagement of clutch II (second speed) and, finally, the disengagement of clutch II (first speed) before passing to idling speed.

In order to obtain reverse gear, it suffices, as for the example of Fig. 1, to slide travelling pinion 46 into position 46¹ (shown in dotted lines) so as to bring it into mesh with a reversing gear (not shown in the drawing) whereby the latter can drive toothed wheel 24, keyed on a sleeve 27 rigid with the plate 28 of clutch II, under the same conditions as those indicated for running in first speed.

With the arrangement above described, I obtain a variable speed and automatic working transmission which, as well in the case of the embodiment of Fig. 1 as in that of Fig. 2, has the following chief advantages over existing transmissions of the same kind:

a. It includes only three clutch devices for a four speed gear box, whereas in known devices, it is generally necessary to make use of four clutches corresponding respectively to the four gear combinations;

b. It includes a reduced number of gears lower than the number of gear elements employed in ordinary four speed boxes;

c. The first and second speed combinations, for which the resisting torque is very great, work respectively through clutches I and II merely intended to transmit the driving torque, whereas clutch III upon which the resisting torque acts, is called into play only for the third speed, and for direct drive, in the case of the embodiment of Fig. 1, and for direct drive and a step up gear ratio in the case of the embodiment of Figs. 2 to 5, that is to say under circumstances in which the resisting torque is small, which permits of reducing the weight, and more particularly the radial dimensions, of said clutch;

d. By positioning some of the clutches at the front and some at the rear of the gear box, I reduce the length of the sleeves or other connection elements connecting the clutches to the gears to be driven;

e. The free wheels, such as 20 and 26 (Fig. 1) or 43 and 48 (Figs. 2 to 5) necessary for permitting certain relative movements between the elements of the gear box, are positioned at advantageous points and their number is reduced to two for a four speed gear box;

f. The particularly simple control of the clutches permits of considering as possible, without involving important technical combinations, the non-automatic or semi-automatic control of the transmission.

In addition, the variable speed transmission illustrated by Figs. 2 to 5 further has the following advantages:

As the third speed is direct drive and the fourth speed corresponds to a step-up transmission, I obtain the advantage that the engine runs at relatively low speed of revolution for high speeds of the vehicle, which renders the drive smoother and permits of saving fuel while reducing wear and tear. Furthermore, in cities it is more frequently possible to run with direct drive.

The automatic bringing into or out of action of the step-up gear combination, under the combined influences of the speed of the vehicle and the resisting torque is obtained through the simultaneous engagement of the three clutches I, II and III, whereas, for direct drive, only two clutches, to wit I and III are in operation. Clutch III is directly connected to the wheels of the vehicle and remains in operation when running in direct drive and with a step-up gear combination, which ensures a safe working thereof and simplifies its construction and its adjustment since its state undergoes no modification at high speeds.

It should be noted that the transmission of the driving power takes place, when in direct drive, through free-wheel device 48, which is positively brought into play for this operation but which turns freely when running with the step-up gear combination.

Futhermore, by arranging the clutches and the gear wheels of the transmission as shown by Figs. 2 to 5, I can dispose the step-up gears 50—51 ahead of the gear box, so that they can be driven directly by the engine and through clutch II.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A variable speed transmission device which comprises, in combination, a driving shaft, a driven shaft, means for unidirectionally coupling said driven shaft with said driving shaft with a reduction gear ratio, said means including an automatic clutch responsive to speed variations of said driving shaft so as to be in operative engagement only for values of said speed exceeding a predetermined value, means for unidirectionally coupling said driven shaft with said driving shaft with a smaller reduction gear ratio, said last mentioned means including an automatic clutch responsive to speed variations of said driving shaft so as to be in operative engagement only for values of said speed exceeding another and higher predetermined value, means, operative by variations of the difference between the driving torque from said driving shaft and the resisting torque from said driven shaft, for disengaging said second mentioned clutch for values of said difference exceeding a predetermined value, and a third clutch, responsive to speed variations of said driven shaft so as to be in operative engagement only for values of said speed exceeding a third and still higher predetermined value, said third clutch being interposed between said driven shaft, on the one hand, and on the other hand parts of both of said coupling means, including the respective clutches thereof, whereby, according as whether the second clutch is in operative engagement or not, two other higher speeds are obtained.

2. A variable speed transmission device which comprises, in combination, a driving shaft, a driven shaft, means for unidirectionally coupling said driven shaft with said driving shaft with a reduction gear ratio, said means including an automatic clutch responsive to speed variations of said driving shaft so as to be in operative engagement only for values of said speed exceeding a predetermined value, means for unidirectionally coupling said driven shaft with said driving shaft with a smaller reduction gear ratio, said last mentioned means including an automatic clutch responsive to speed variations of said driving shaft so as to be in operative engagement only for values of said speed exceeding another and higher predetermined value, means, operative by the difference between the driving torgue transmitted from said driving shaft to said second mentioned clutch and the resisting torque transmitted thereto from said driven shaft, for disengaging said second mentioned clutch when said difference is not zero, and a third clutch, responsive to speed variations of said driven shaft so as to be in operative engagement only for values of said speed exceeding a third and still higher predetermined value, said third clutch being interposed between said driven shaft, on the one hand, and, on the other hand, one of said two first mentioned clutches directly, and a part of the coupling means leading to the other of said two first mentioned clutches, whereby, according as whether the second mentioned clutch is in operative engagement or not, two other higher speeds are obtained, one of which corresponds to direct drive.

3. A variable speed transmission device which comprises, in combination, a driving shaft, a driven shaft, means for unidirectionally coupling said driven shaft with said driving shaft with a reduction gear ratio, said means including an automatic clutch responsive to speed variations of said driving shaft so as to be in operative engagement only for values of said speed exceeding a predetermined value, means for unidirectionally coupling said driven shaft with said driving shaft with a smaller reduction gear ratio, said last mentioned means including an automatic clutch responsive to speed variations of said driving shaft so as to be in operative engagement only for values of said speed exceeding another and higher predetermined value, means, operative by the difference between the driving torque transmitted from said driving shaft to said second mentioned clutch and the resisting torque transmitted thereto from said driven shaft, for disengaging said second mentioned clutch when said difference is not zero, and a third clutch, responsive to speed variations of said driven shaft so as to be in operative engagement only for values of said speed exceeding a third and still higher predetermined value, said third clutch being interposed between said driven shaft, on the one hand, and, on the other hand, both the second mentioned clutch directly and a part of the coupling means between the first mentioned clutch and said driven shaft, whereby, when the second mentioned clutch is disengaged by the reaction of the resisting torque, a third speed is obtained, corresponding to a still higher reduction gear ratio, and, when said second mentioned clutch is in operative engagement, direct drive is obtained.

4. A variable speed transmission device which comprises, in combination, a driving shaft, a driven shaft, means for unidirectionally coupling said driven shaft with said driving shaft with a reduction gear ratio, said means including an automatic clutch responsive to speed variations of said driving shaft so as to be in operative engagement only for values of said speed exceeding a predetermined value, means for unidirectionally coupling said driven shaft with said driving shaft with a smaller reduction gear ratio, said last mentioned means including an automatic clutch responsive to speed variations of said driving shaft so as to be in operative engagement only for values of said speed exceeding another and higher predetermined value, means, operative by the difference between the driving torque transmitted from said driving shaft to said second mentioned clutch and the resisting torque transmitted thereto from said driven shaft, for disengaging said second mentioned clutch when said difference is not zero, and a third clutch, responsive to speed variations of said driven shaft so as to be in operative engagement only for values of said speed exceeding a third and still higher predetermined value, said third clutch being interposed betwen said driven shaft, on the one hand, and, on the other hand, both the first mentioned clutch, directly, and a part of the coupling means between the second mentioned clutch and said driven shaft, whereby, when the second mentioned clutch is disengaged by the reaction of the resisting torque, direct drive is obtained, and, when said second mentioned clutch is in operative engagement, a step-up gear ratio is obtained.

5. An automatic transmission for coupling driving and driven shafts comprising, first and second automatic clutches, two gear combinations controlled by said clutches and operatively connected to the driven shaft, means controlled by lower and higher speeds of the driving shaft to engage said two clutches for first and second speeds respectively, a third automatic clutch operatively connected to the driven shaft, means responsive to the speed of the driven shaft and automatically operative when the power required by the driven shaft is lower than the power delivered by the driving shaft to engage said third clutch, said third clutch being operatively connected to said second clutch to transmit the torque of the driven shaft thereto, means responsive to a predetermined excess of the power required by the driven shaft over the power delivered by the driving shaft to disengage said second clutch for third speed, said last means becoming inoperative when such excess of power drops below said predetermined value to permit said first means to reengage said second clutch for fourth speed.

6. A device as claimed in claim 5 in which the operative connection between said third and second clutches includes at least one of said gear combinations.

7. A device as claimed in claim 5, in which said third speed is a direct drive.

8. A device as claimed in claim 5, in which said fourth speed is a direct drive.

CHARLES EDOUARD HENRIOD, Fils.